United States Patent [19]

Nopper

[11] Patent Number: 5,094,791

[45] Date of Patent: Mar. 10, 1992

[54] PROCESS FOR PRODUCING FIBROUS MATS AS A STARTING MATERIAL FOR COMPRESSION MOULDED ARTICLES

[75] Inventor: Herbert Nopper, Kuppenheim, Fed. Rep. of Germany

[73] Assignee: Casimir Kast GmbH & Co. KG, Gernsbach, Fed. Rep. of Germany

[21] Appl. No.: 519,642

[22] Filed: May 7, 1990

Related U.S. Application Data

[63] Continuation of Ser. No. 791,341, Oct. 26, 1985, abandoned.

[30] Foreign Application Priority Data

Oct. 25, 1984 [DE] Fed. Rep. of Germany ....... 3439033

[51] Int. Cl.$^5$ .............................................. B27N 3/04
[52] U.S. Cl. .................... 264/112; 264/510; 264/518; 264/113
[58] Field of Search ............... 264/518, 112, 113, 109, 264/136, , 510, 511, 115, 118

[56] References Cited

U.S. PATENT DOCUMENTS

| | | | |
|---|---|---|---|
| 2,543,101 | 2/1951 | Francis | 264/112 |
| 2,624,079 | 1/1953 | Duvall | 264/113 |
| 3,790,417 | 2/1974 | Paterson et al. | 264/113 |
| 4,217,078 | 8/1980 | Buell | 425/81.1 |

FOREIGN PATENT DOCUMENTS 56-137949 10/1981 Japan .................... 264/113

*Primary Examiner*—Mary Lynn Theisen
*Attorney, Agent, or Firm*—Antonelli, Terry, Stout & Kraus

[57] ABSTRACT

In a process for producing fibrous mats from starting material for compression moulded articles, fiberized waste materials are mixed with thermoplastic and/or duroplastic binders, the mixture is spread on to an air-permeable conveyor belt to form a first fleece layer, a fabric is placed loosely on said fleece layer, then a second fleece layer is spread on the fabric or lattice and subsequently the composite fleece is compressed at elevated temperature and under pressure to form a transportable mat from which individual moulded articles can be produced by compression moulding at temperatures between 180° and 220° C., the fabric being sprayed with a liquid phase duroplastic finish prior to its deposition. In this way the fabric finish composition can be matched to the binder for the fibres, so that completely satisfactory binding or tying in of the fabric into the fleece layers can be achieved.

15 Claims, 4 Drawing Sheets

PROCESS FOR PRODUCING FIBROUS MATS AS A STARTING MATERIAL FOR COMPRESSION MOULDED ARTICLES

This is a continuation of application Ser. No. 791,341, filed Oct. 26, 1985 now abandoned.

BACKGROUND OF THE INVENTION

The present invention relates to a process for producing fibrous mats as a starting material for compression moulded articles, in that fiberized materials, preferably waste materials, are mixed with thermoplastic and/or duroplastic binders, the mixture is spread to form a first fleece layer, on which is placed a fabric, e.g. a polyester fabric, with a heat-activatable finish having an affinity for the fibre binder, then a further fleece layer is spread thereon and the thus formed composite or sandwich fleece is compressed accompanied by the thermal activation of the binder and the finish to form a mat, from which it is possible to produce moulded articles by compression moulding at elevated temperatures.

A process and an apparatus for performing the same forms the subject matter of the earlier-dated U.S. patent application of the present inventor (Ser. No. 697,452). Whereas single fibrous mats (e.g. according to DE-OS 28 45 112) are relatively sensitive during transportation and storage as a result of their limited inherent stability and consequently can only be stored and transported in stacked blanks, the fabric gives the mat an increased stability and flexibility in the aforementioned process, so that it can e.g. be rolled up and can be removed from the reel for the purpose of producing the compression moulded articles. The further decisive advantage of such composite fleeces made from fibrous fleece or non-woven fabric layers with an incorporated fabric is that the tensile strength is considerably increased, so that even in the case of moulded articles with low contours, the compression moulding thereof can take place in a single operation and no preshaping is required, as is the case with single fibrous fleeces.

The fabric used in the said process, preferably a polyester fabric must on the one hand have a slip-resistant finish and on the other hand the finish must be chosen in such a way that it has no negative effects on the mat and/or moulded article during the thermal processes (heat activation of the binder during mat production and curing of the binder during moulding to give the moulded article). Thus, the finish is preferably formed from a material having an affinity to the binders for the fibres, e.g. synthetic resins, such as phenolic resins and the like. It is disadvantageous that fabrics finished in this way are only commercially available in specific qualities and types, which are generally not specifically matched to the production of fibrous mats and/or compression moulded articles. This applies not only with regards to the composition, but e.g. also with regards to the weight per unit area of the finish. Finally, such completely finished fabrics are relatively expensive.

SUMMARY OF THE INVENTION

The problem of the present invention is to so further develop the process of the aforementioned type, that the finish of the fabric used can be matched to the particular material composition of the mat and in particular an inexpensive fabric can be made available.

According to the invention this problem is solved in that prior to placing the fabric on the first fleece layer, the finish formed from a liquid phase is applied to the fabric.

The essence of the process according to the invention is that the fabric finish is not directly produced by the fabric manufacturer or in specific finishing plants, i.e. in such a way that a completely finished fabric is used during mat production and instead the finishing process is moved to the mat production point, so that in this way it is possible to use an inexpensive raw fabric having an absolutely constant quality. Finishing the fabric at the point of mat production can then take place as a function of the physical and chemical requirements existing there. This applies both with regards to the choice of finish, which must be matched to the particular binders used for the fibres, and with regards to the quantity, i.e. the weight per unit area of the finish, in order to be able to e.g. control the binding or tying in of the fabric into fleece layers during heat activation of the composite fleece and the binder proportion resulting from the finish for the complete composite fleece or compression moulded article.

The finish applied from the liquid phase to the fabric is preferably dried and activated in connection with the thermal activation of the composite fleece. This embodiment of the process has the advantage that the drying process can be incorporated into the heat activation process of the fleece binder.

The finish can be applied from the liquid phase by rolling, but is preferably applied by spraying, because a more accurate and simple dosing is possible with spray impregnation.

The polymers used for the finish can be used in dissolved form or as an aqueous phase in pure solution, dispersion or emulsion, preference to the aqueous phase for reasons of occupational hygiene and protection of the environment.

Advantageously the finish from the liquid phase is applied with a weight per unit area of 50 to 60 $g/m^2$ (liquid) to both sides of the fabric, so that there is a total weight per unit area of 100 to 120 $g/m^2$. Such a weight per unit area can be achieved without difficulty from aqueous solutions and emulsions or dispersions, which have a solids content of polymers of 40 to 50%.

Preferably the liquid phase of the finish is preheated to a moderate temperature of e.g. 40° to 60° C. prior to the application to the fabric. The preheating leads to a uniform viscosity for the application process which is independent of the ambient temperature. As the viscosity decreases in accordance with the preheating temperature, i.e. the sprayability is improved, there is no need for the otherwise necessary greater water dilution which once again leads to a saving during the drying process. If the aqueous phase is preheated, then the weight per unit area of the finish applied can be reduced to approximately 40 $g/m^2$ (liquid) on both sides of the fabric.

In the case of a conventional web speed of the composite fleece of approximately 6 m/min and a temperature between 100° and 130° C. during the heat activation phase, the fabric finish is dried and hardened to the necessary extent.

For hardening or curing purposes, it is possible to use all binders which are compatible with the binders of the fibres and in particular synthetic resins or latexes. Preference is given to the use of an aqueous phenolic resin solution, e.g. of thermosetting one-stage resins or resols which have been adjusted alkaline. This finish is not only of the same type as the binders used with the fabrous fleeces of the aforementioned type, but can also be jointly processed without difficulty with other resins, such as melamine resins and the like. Such a phenolic resin solution has the further advantage of a relatively broad crosslinking range, which gives the possibility, in connection with the binding or tying in of the fabric into the fleece layers, of initially only carrying out a partial hardening in such a way that the fabric flexibility is retained, so that the compressed mat can still be rolled up, whereas the final curing of the phenolic resin finish only takes place at the time of the compression moulding of the moulded article.

In place of the phenolic resin solution, it is also possible to use a styrene-butadiene latex (SBR latex) in optionally phenolic or melamine resin, polyvinyl or polymethacrylate-modified form. In order to assist the crosslinking of the SBR latex, it is possible to use crosslinking agents, such as zinc oxide or the like. However, there is generally no need for these. These latexes have a high degree of adhesion with respect to almost all fibres of a synthetic or natural nature.

Other suitable finish substances are butadiene-acrylonitrile or methacrylate-styrene copolymers, optionally in modified form.

As a further advantageous modification, the finish in liquid phase can additionally contain a blowing agent for foam resin formation, whose decomposition temperature is above the temperature during the heat activation of the composite fleece and is e.g. at 120° to 130° C.

This blowing agent incorporated into the liquid phase becomes part of the fabric finish during spraying on and subsequent activation of the resin, it having no effect during the heat activation process as a result of its higher decomposition temperature. Only at the time of the compression moulding of the moulded article, which takes place at temperatures above 150° C., is there a start to the decomposition of the blowing agent and the expansion of the finish, which consequently not only ensures the binding in of the fabric into the mat or moulded article, but also leads to an increase in the cavity volume in the moulded article and consequently a density reduction and improvement to the insulation values. The technical possibilities in connection with the use of foam resins as binders are described in DE-OS 31 27 846 and require no further explanation here. It can be advantageous to apply the finish with a weight per unit area above 20 to 30 g/m² (solid), i.e. a level above that necessary for binding the fabric into the fleece layers, so as to increase the foam resin penetration of the fibres.

For the purpose of performing the process, the invention is based on an apparatus known from U.S. patent application Ser. No. 697,452 with a first spreading means for applying a mixture of fiberized materials and binder to an air-permeable conveyor belt for the purpose of producing the first fleece layer, a following levelling device, a supply device for the loose application of the fabric to the first levelled fleece layer, a following second spreading meand for producing the second fleece layer, a following levelling device, a device arranged following the latter and above the conveyor belt for passing hot air through the composite fleece and following pressure rollers for compressing the composite fleece to form a mat, as well as a suction means positioned below the conveyor belt in the vicinity of the spreading means and hot air device for sucking air through the fleece layers or the composite fleece. According to the invention this apparatus is characterized by a device for applying the finish in liquid phase form associated with the fabric supply device.

Preferably the applicator means is located behind the delivery end of the supply device for the fabric and directly above the fleece, so that the finish is still in the liquid or moist state on applying the fabric and is dried and at least partly hardened in connection with the binder heat activation process. Possible drips or mist forming during spraying also pass on to the fleece and are not lost.

According to a further preferred embodiment, the applicator is a spraying device, which e.g. has a plurality of flat nozzles spaced from one another at right angles in the running direction of the conveyor belt.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

Figure 1:
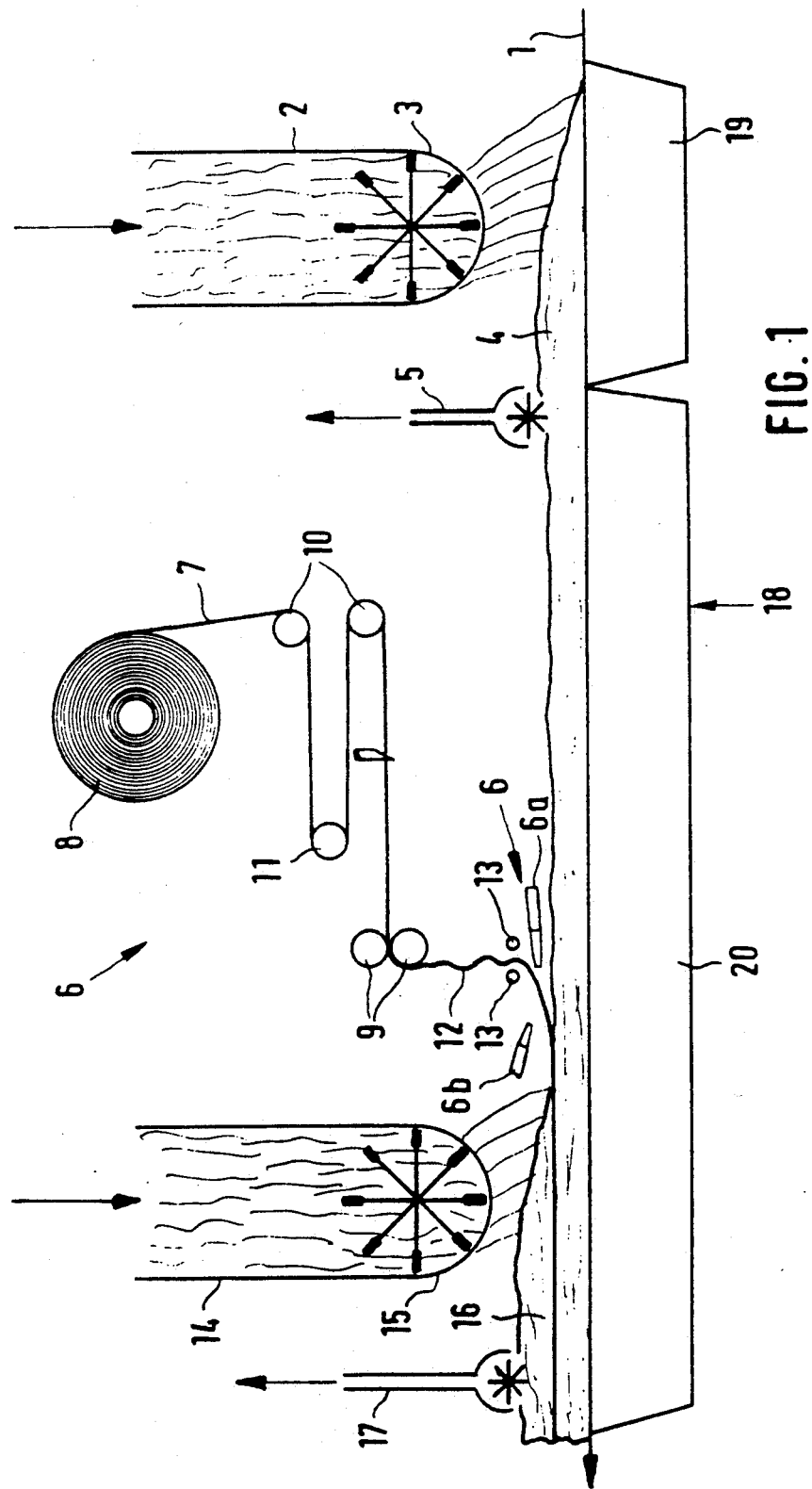
FIGS. 1 and 2 A diagrammatic side view of the mat production plant.

The plant initially has an air-permeable conveyor belt 1, which is e.g. formed from a fabric or lattice. Above the entrance of the conveyor belt 1 into the plant is provided a first spreading means 2, which receives a fibrous material and supplies it via a spreading head 3 on to the conveyor belt for the purpose of forming a first fleece layer 4. Behind the spreading means is provided a mill-like levelling means 5, which brings the fleece layer 4 to a uniform thickness.

In the conveying direction behind the levelling means 5 is provided a supply means 6 for depositing a continuous polyester fabric or lattice 7 on to the first fleece layer 4. Fabric or lattice 7 is located on a delivery reel 8 of the supply means and is drawn off therefrom by means of draw-off rollers 9. The fabric or lattice passes over guide rollers 10 and a tension roller 11. The drive of draw-off rollers 9 is so matched with respect to the speed of conveyor belt 1 that the fabric or lattice drops loosely in the area 12 below rollers 9, so that it is placed on the first fleece layer 4 free from any forces. In area 12 is also provided a sensing device 13, which stops parts of the plant if there is no fabric or lattice in the vicinity of the sensing device, i.e. reel 8 is for example empty. In area 12 behind the tension rollers is also provided a spraying device 6, which e.g. has a row of flat nozzles 6a or 6b on either side of the running-off fabric and by means of which the liquid phase finish is sprayed on to the fabric. The flat nozzles are preferably located directly above fleece layer 4 and advantageously slope in the direction of the latter. Behind the fabric deposit is provided a further spreading means 14, which once again takes up fibres and supplies them via a spreading head 15 to give a uniform second fleece layer 16. A mill-like levelling means 17 is once again located behind the spreading means 14.

As can also be seen in FIG. 1, below the complete conveyor belt 1 and at least up to the second levelling means 17 is provided a suction means 18, which, in the represented embodiment, comprises two suction boxes 19 and 20. This suction means ensures that the first fleece layer firmly engages on conveyor belt 1, that the fleece thickness is maintained, that the fabric or lattice 7 is sucked on to the first fleece layer and finally that the second fleece layer 16 adheres to the lattice or fabric 7 and the first fleece layer 4.

Figure 2:
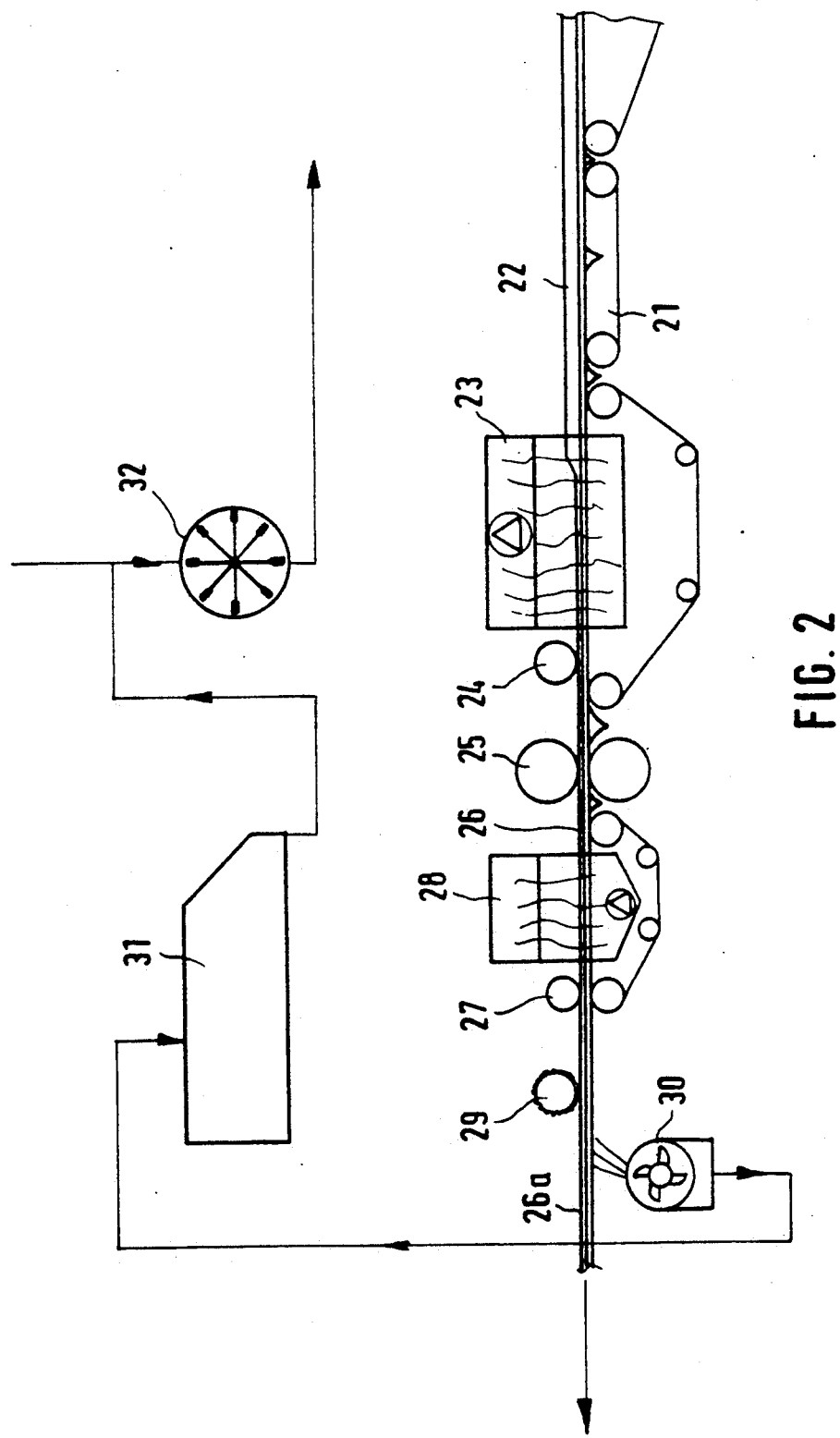

As shown in FIG. 2, the composite fleece 22 finally reaches a conveyor-type weigher 21, which measures the specific surface load and controls the second levelling means 17 and optionally also the first levelling means 5 in accordance with the desired value. Composite fleece 22 finally reaches a hot air means 23, by means of which hot air is forced or sucked through the composite fleece in order to activate the binder for the fibres and the fabric finish. Behind hot air means 23 are provided a preforming roller 24 and a moulding calender 25, which reduce the composite fleece to the desired final thickness. Composite fleece 22 leaves the moulding calender 25 as mat 26, which is moved by means of carrier rollers 27 through a cooling station 28. Behind the carrier rollers 27 is located a trimming means 29, which levels the longitudinal edges of mat 26. The resulting edge strips can be comminuted by means of a cutting mill 30 and subsequently stored at 31 and, when required, material can be removed from the central comminuting mill 32, which is used for producing the fibrous material supplied to spreading means 2 and 14.

Figure 4:
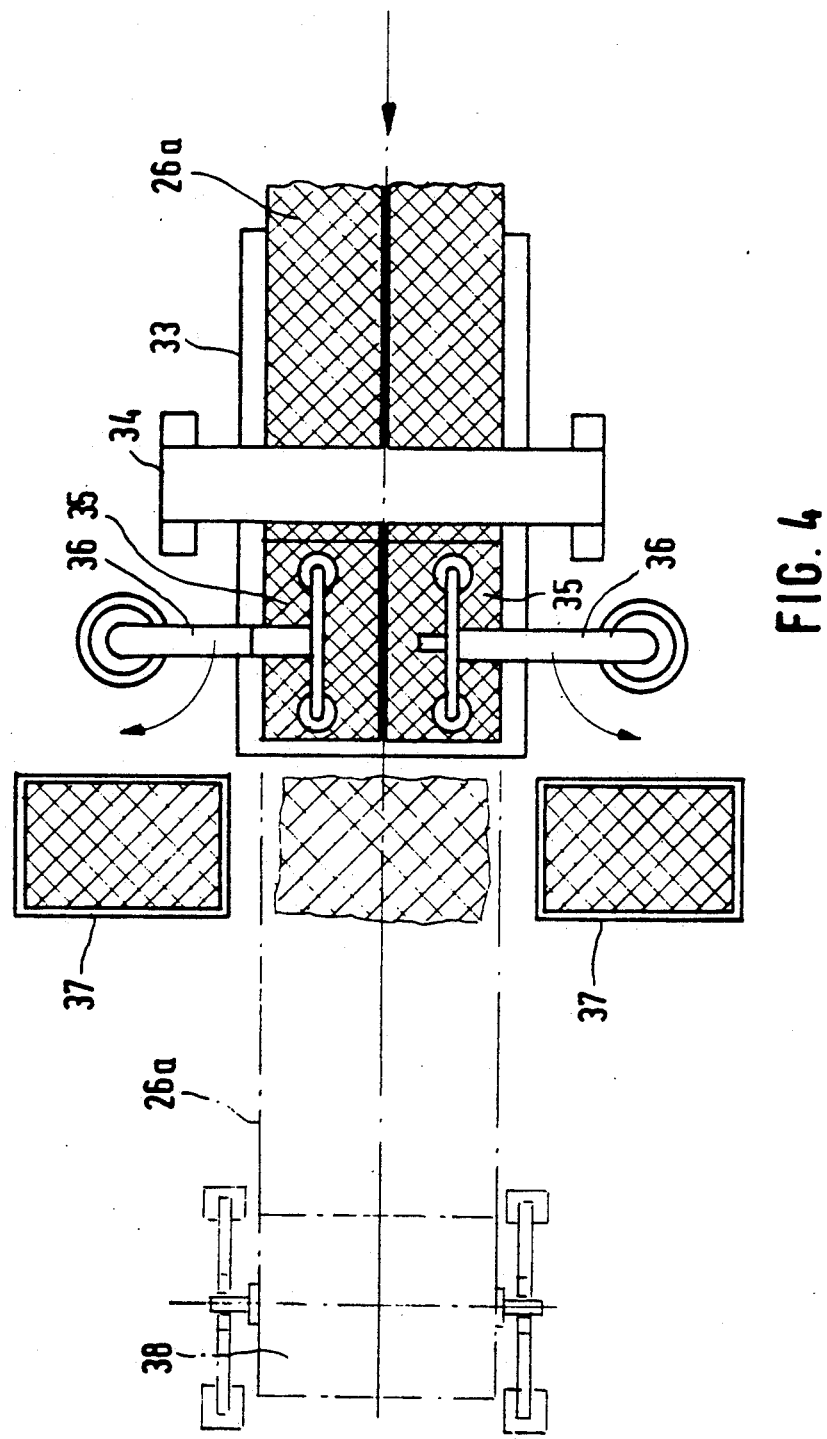
FIG. 4 An alternative for the production of mat blanks.

The trimmed mat 27 prepared for further processing can then be wound up to form a reel or, as shown in FIG. 4, can be cut up into individual blanks. For this purpose, mat 27 runs on to a cutting table 33 with a cross-cutter 34. Simultaneously or beforehand, mat 27 is longitudinally cut, so that two blanks 35 are in each case formed behind the cross-cutter 34 and by means of pivotable siphons or suction lifting means 36 are placed on lateral stacks 37. Dot-dash lines in FIG. 4 also show the alternative in which mat 27 is wound up to form a reel 38.

Figure 3:
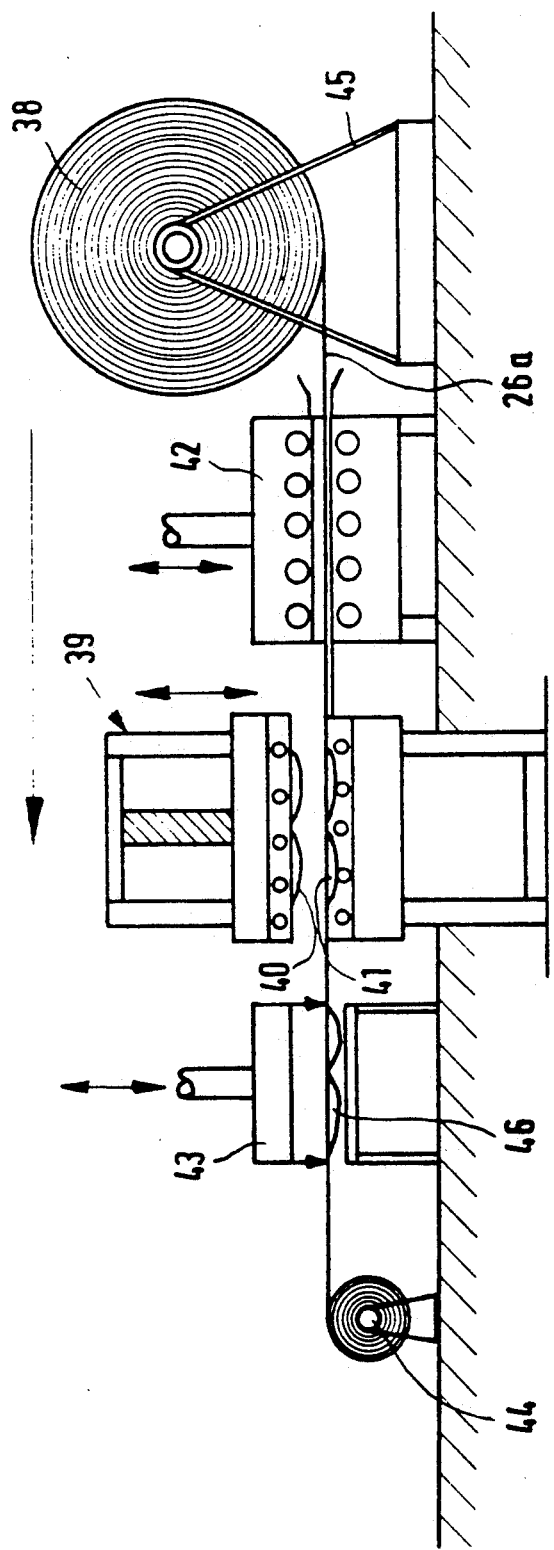
FIG. 3 A diagrammatic side view of the plant for producing compression moulded articles from a mat reel.

FIG. 3 is a diagrammatic view of an embodiment for producing compression moulded articles from a mat 27 wound up to form a reel 38. As its essential component, the plant has a moulding press 39 with a heated upper mould 40 and a heated lower mould 41. In the represent embodiment, the press stroke is performed by the upper mould 40. Upstream of moulding press 39 is positioned a heating oven 42 and downstream thereof is located a separating means 43 and behind same a winding means 44. Mat reel 38 is stored on a reel rack 45 upstream of heating oven 42. Mat 27 is drawn off reel 38 in timed manner by winding means 44, firstly passing through oven 42 for activating the binder and during the next working stroke it enters moulding press 39. Moulds 40 and 41 are closed, so that a moulded article is shaped from the mat and during the next working stroke is passed into separating means 43 as a result of the still existing binding in the surrounding mat material. The moulded article 46 is then separated from the mat by a stamping or punching process and is moved away sideways, whilst the residual mat is wound up to form a reel again by means of winding means 44. As has already been described in connection with the marginal strips in FIG. 2, said material can be supplied to a comminuting device and then to the fibrous material production plant.

What is claimed is:

1. A process for producing fibrous mats as a starting material for compression moulded articles, the process comprising the steps of:
   mixing fiberized materials with thermoplastic binders to form a mixture of fiberized materials and binder;
   spreading said mixture of fiberized materials and binder to form a first fleece layer;
   loosely dropping a fabric having a heat-activatable finish with an affinity for the binder on the first fleece layer;
   applying a liquid finish of one of a pure solution, dispersion or emulsion with a weight per unit area of 50-60 g/m$^2$ directly to both sides of said fabric immediately prior to the loosely dropped fabric contacting the first fleece layer;
   spreading a second fleece layer on said fabric to form a composite fleece;
   compressing said composite fleece to form a mat while simultaneously thermally activating said binder and drying and activating said finish;
   and compression moulding the mat at elevated temperatures whereby a single type of fabric may be utilized in the production of the fibrous mats for a variety of different fleeces.

2. A process according to claim 1 wherein said finish is applied by one of rolling or spraying.

3. A process according to claim 1, wherein said finish is one of an aqueous emulsion or dispersion with a solids content of 40 to 50%.

4. A process according to claim 3, wherein said finish is preheated to a moderate temperature in the range of 40° to 60° C. prior to application to said fabric.

5. A process according to claim 4, wherein a weight per unit area of the applied finish is approximately 40 g/m$^2$ on both sides of the fabric.

6. A process according to claim 5, wherein said thermal activation takes place at a composite fleece web speed of approximately 6 m/min at a temperature between 100° and 130° C.

7. A process according to claim 6, wherein said finish is an aqueous phenolic resin solution.

8. A process according to claim 7, wherein said phenolic resin finish is partially hardened during said thermal activation while maintaining fabric flexibility.

9. A process according to claim 8, wherein final curing of said phenolic resin finish takes place during moulding of a moulded article.

10. A process according to claim 1 wherein said finish is a styrene-butadiene latex.

11. A process according to claim 10, wherein said finish is one of a phenolic or melamine resin, polyvinyl or polymethacrylate-modified styrene-butadiene latex.

12. A process according to 1, wherein said finish is a butadiene-acrylonitrile copolymer.

13. A process according to claim 1, wherein said finish is a methacrylate-styrene copolymer.

14. A process according to claim 1, wherein said finish contains a blowing agent for foam resin formation, said blowing agent having a decomposition temperature above a temperature for said thermal activation and is in a range of 120° to 130° C. and wherein said finish is applied with a weight per unit area greater than 20 to 30 g/m$^2$.

15. A process according to claim 12, wherein said copolymer has a modified form.

* * * * *